United States Patent
Takeuchi

(10) Patent No.: US 6,402,194 B1
(45) Date of Patent: Jun. 11, 2002

(54) AIR BELT AND AIR BELT ASSEMBLY

(75) Inventor: Hiroyuki Takeuchi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/695,057

(22) Filed: Oct. 25, 2000

(30) Foreign Application Priority Data

Oct. 28, 1999 (JP) ........................................ H11-306658

(51) Int. Cl.[7] .............................................. B60R 21/18
(52) U.S. Cl. ..................... 280/733; 280/729; 280/730.1
(58) Field of Search .............................. 280/733, 730.1, 280/729

(56) References Cited

U.S. PATENT DOCUMENTS

| | | | |
|---|---|---|---|
| 3,830,519 A | * 8/1974 | Lewis | 280/733 |
| 3,841,654 A | * 10/1974 | Lewis | 280/733 |
| 3,866,940 A | * 2/1975 | Lewis | 280/733 |
| 3,888,503 A | * 6/1975 | Hamilton | 280/733 |
| 5,465,999 A | * 11/1995 | Tanaka et al. | 280/733 |
| 5,466,003 A | * 11/1995 | Tanaka et al. | 280/733 |
| 5,474,326 A | * 12/1995 | Cho | 280/733 |
| 5,597,178 A | * 1/1997 | Hardin, Jr. | 280/733 |
| 5,851,055 A | * 12/1998 | Lewis | 280/733 |
| 5,947,513 A | * 9/1999 | Lehto | 280/733 |
| 6,142,511 A | * 11/2000 | Lewis | 280/733 |
| 6,170,863 B1 | * 1/2001 | Takeuchi et al. | 280/733 |
| 6,276,714 B1 | * 8/2001 | Yoshioka | 280/733 |
| 6,276,715 B1 | * 8/2001 | Takeuchi | 280/733 |

FOREIGN PATENT DOCUMENTS

| | | |
|---|---|---|
| EP | 0 904 993 A2 | 3/1999 |
| JP | 5-85301 | 4/1993 |
| WO | WO 99/40247 | 8/1999 |

* cited by examiner

*Primary Examiner*—Brian L. Johnson
*Assistant Examiner*—Deanna Draper
(74) *Attorney, Agent, or Firm*—Foley & Lardner

(57) ABSTRACT

An air belt that is smoothly passed through an anchor and is retracted directly by a retractor is provided. A belt of an air belt includes a single layer portion having a relatively small width, which is formed by a belt, a flat tubular multiple layer portion, and an intermediate portion. The width of the belt is gradually reduced from the multiple layer portion to the single layer portion. A bag is provided only in the multiple layer portion. A distal end of the bag is connected to a tongue, together with a distal end of the belt. The single layer portion is passed through a through anchor and is connected to a retractor. The retractor retracts and extends the belt. The belt is an integral body extending continuously from the single layer portion to a hardly expanding portion of the intermediate portion and the multiple layer portion. An easily expanding portion, which is provided along each side of the intermediate portion and the associated side of the multiple layer portion, is easily expanded sideward when the bag is inflated.

12 Claims, 7 Drawing Sheets

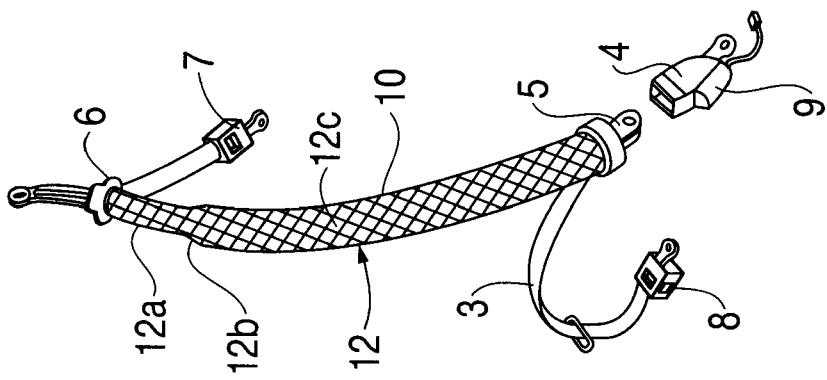
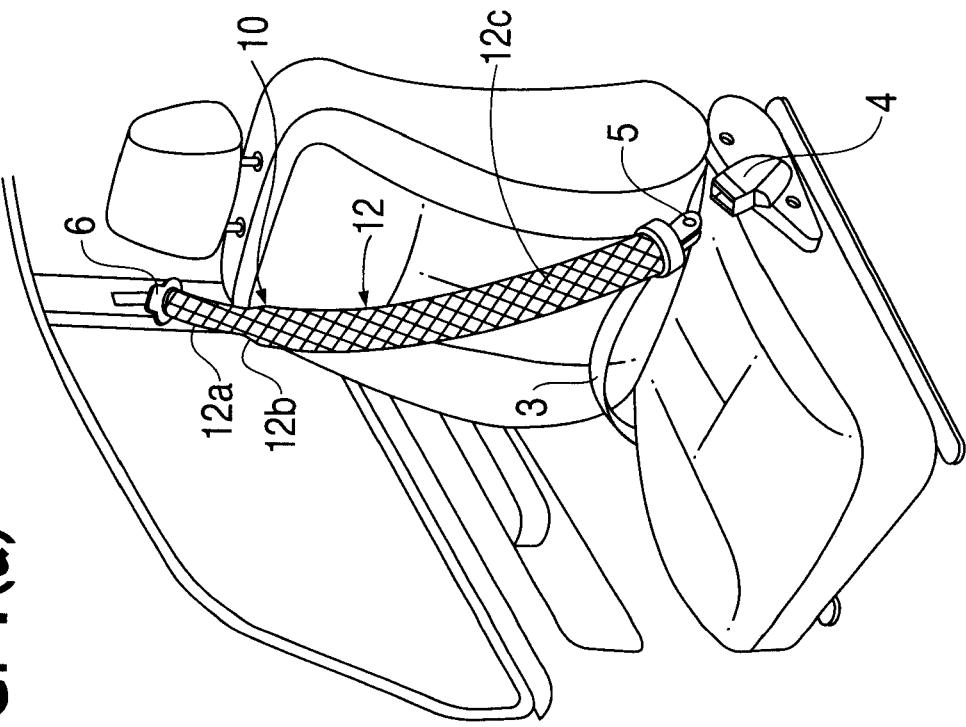

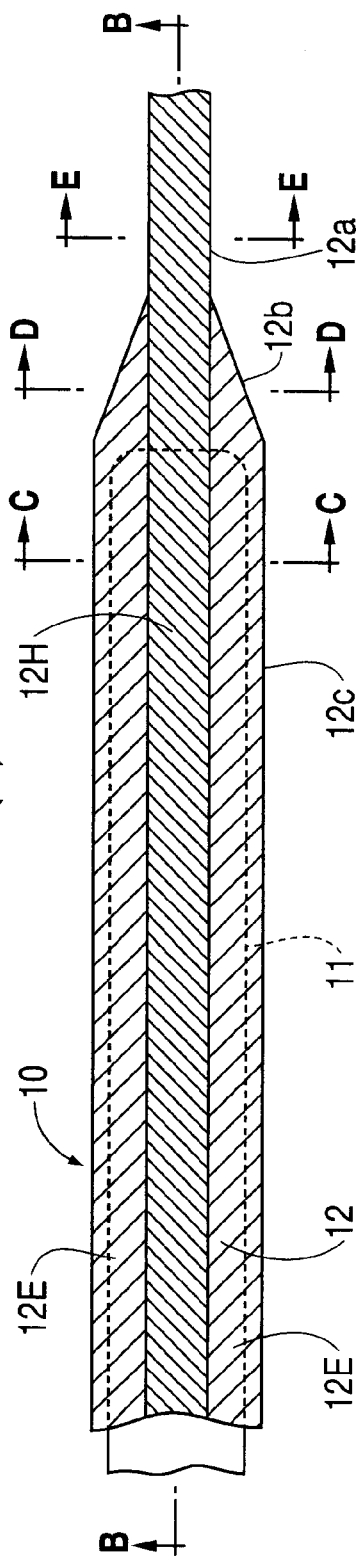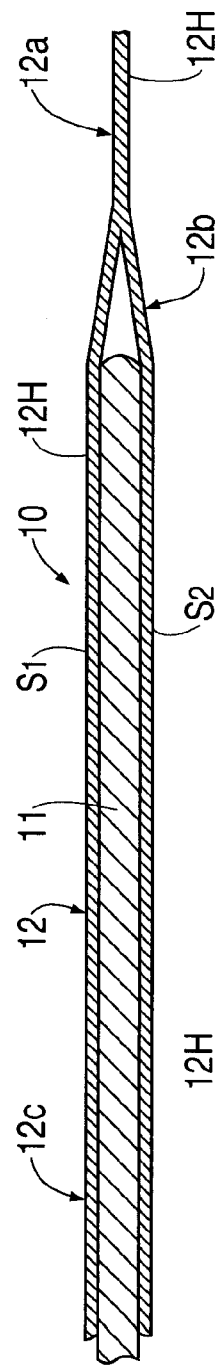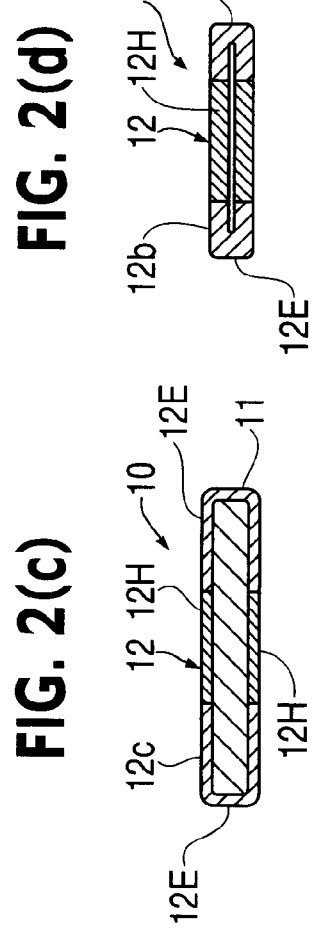

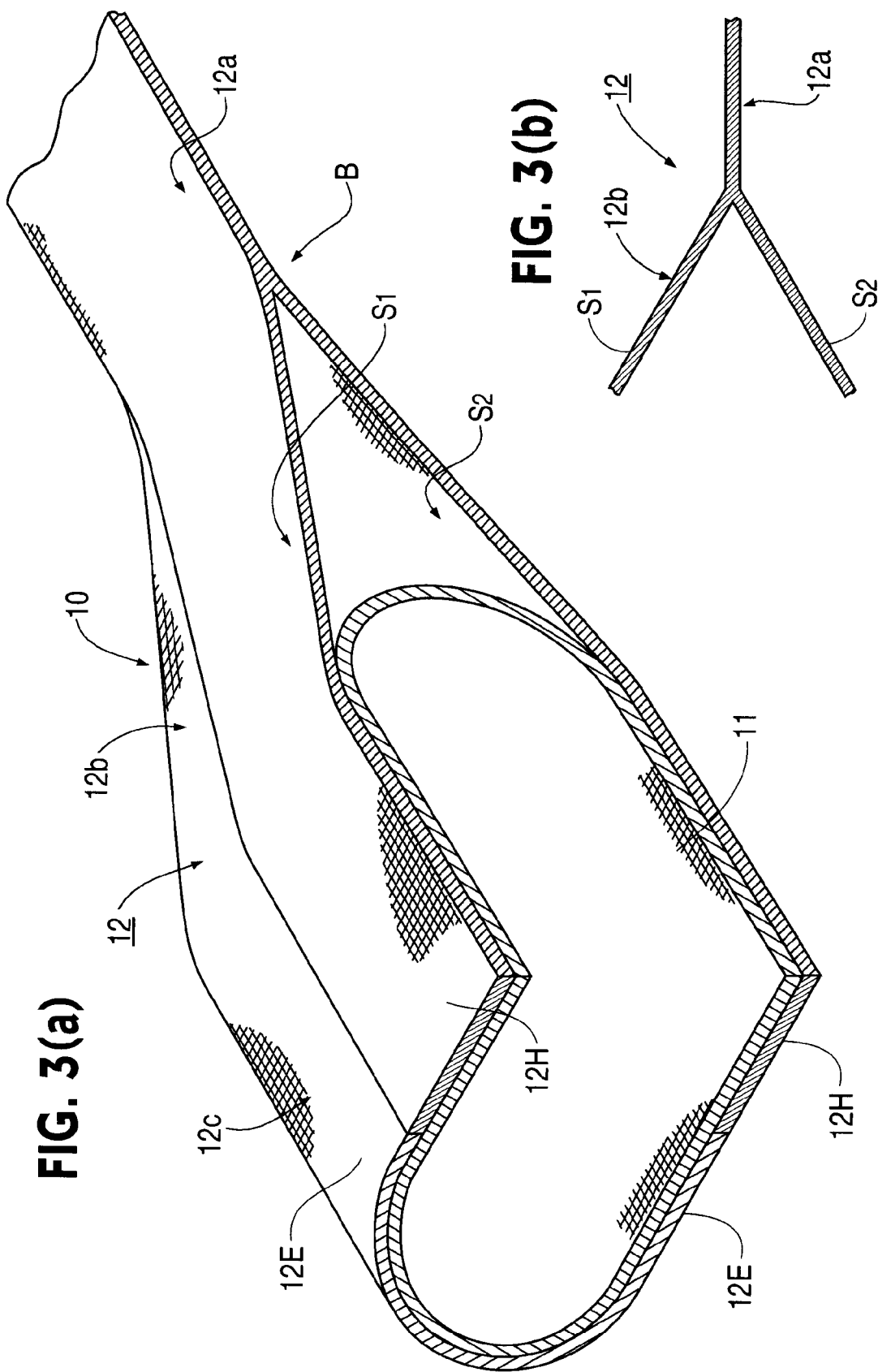

AIR BELT AND AIR BELT ASSEMBLY

BACKGROUND OF THE INVENTION

The present invention relates to air belts and to corresponding air belt assemblies that protect passengers in vehicles when, the vehicle crashes, and, more particularly, to air belts and air belt assemblies having a portion inflated by gas from a gas generator.

Japanese Unexamined Patent Publication No. 5-85301 describes a general type of air belt assembly. FIG. 5 is a perspective view showing the air belt assembly of this publication. This air belt assembly 1 includes an air belt 2a, webbing 2a, a lap belt 3, a buckle device 4, a tongue 5, and a through anchor 6. The air belt 2 extends over a passenger's body diagonally from the right side to the left side. The webbing 2a has one end coupled to the air belt 2. The lap belt 3 extends over a passenger's body from the right side to the left side. The buckle device 4 is secured to, for example, the vehicle's floor. The tongue 5 is inserted in the buckle device 4 when the belts are fastened. The through anchor 6 guides the webbing 2a.

The webbing 2a is formed by a normal type belt such as a typical, prior art seat belt and is slidably guided by the through anchor 6. The other end of the webbing 2a is secured to a seat belt retractor having an emergency locking mechanism (ELR) 7 fixed to the vehicle body. The retractor 7 thus retracts the webbing 2a. The upper end of the air belt 2 is connected to the webbing 2a through, for example, sewing, and the lower end of the air belt 2 is connected to the tongue 5.

The lap belt 3 is formed by a normal type belt such as a typical seat belt. An end of the lap belt 3 is connected to the tongue 5, and the other end of the lap belt 3 is connected to a seal belt retractor (ELR) 8 secured to the vehicle body. A gas generator 9 is coupled to the buckle device 4 and is activated to generate high pressure gas in case of an emergency such as a car crash. A passage extends in the tongue 5 and the buckle device 4 for introducing gas from the gas generator 9 to the air belt 2.

The air belt 2 is formed by a belt-like bag having a relatively large width, which is folded to reduce its width and is encompassed by a cover. The air belt 2 is normally maintained in a belt-like shape. The air belt assembly 1 is used in the same manner as a prior art seat belt assembly. If the gas generator 9 is activated due to, for example, a car crash, the air belt 2 is expanded to protect the passenger, as indicated by the double dotted broken lines.

In this air belt assembly, the air belt 2 has a cylindrical shape having a relatively large diameter when expanded. The interior volume of the air belt 2 is thus increased, and a relatively large amount of gas is needed for fully expanding the air belt 2.

Further, in this air belt assembly, the retractor 7 retracts the webbing 2a, which is connected to the air belt 2. This is because the thickness of the air belt 2 is larger than that of the webbing 2a, and the air belt 2 is hard to pass through the through anchor 6 and retract by means of the retractor 7.

SUMMARY OF THE INVENTION

Accordingly, it is an objective of the present invention to provide an air belt having a flat shape when expanded.

Accordingly, it is another objective of the present invention to eliminate the webbing 2a and to provide an air belt having a belt formed integrally with an expandable portion of the air belt that is passed through a through anchor and is retracted directly by a retractor.

An air belt of the present invention includes a belt having a hollow expandable portion and a bag provided in the expandable portion of the belt. The air belt is expanded by introducing gas in the bag. The air belt is characterized in that each side of the expandable portion in a width direction is an easily expanding portion and that an intermediate portion of the expandable portion in the width direction is a hardly expanding portion.

When gas is introduced in the bag of this air belt, only the opposite sides of the belt are expanded sideward. The air belt is thus expanded in a flat shape. The amount of the gas needed to expand this air belt is less than the amount of the gas needed to expand the prior art cylindrical air belt. Further, the bag is minimized, and the air belt becomes lighter. The air belt also becomes thinner.

The air belt of the present invention includes a solid portion that is smoothly passed through an anchor. Further, a retractor smoothly retracts and extends the air belt.

It is preferred that the width of the expandable portion of the air belt according to the present invention is larger than the width of the non-expandable portion when the expandable portion is not expanded and that the width of the air belt is gradually reduced from the expandable portion to the non-expandable portion. The solid portion of the air belt having a relatively small width is thus smoothly passed through the through anchor and is retracted and extended smoothly by the retractor. The air belt becomes smaller gradually from the expandable portion having a relatively large width to the non-expandable portion having a relatively small width. This structure eliminates a portion on which reactive force concentrates or which is freely movable (such as a projection having a movable distal end), thus improving the durability of the air belt.

In this case, it is preferred that the width of the hardly expanding portion of the expandable portion is substantially equal to the width of the non-expandable portion. It is thus easy to form the air belt as an integral woven structure extending continuously from the hardly expanding portion of the expandable portion to the non-expandable portion.

The width of the expandable portion may be larger than the width of the non-expandable portion by one to two centimeters.

An air belt of the present Invention includes a belt having a hollow expandable portion and a bag provided in the expandable portion of the belt. The air belt is expanded by introducing gas in the bag. The air belt is characterized in that the belt extends continuously from one end of the air belt to the other and that a non-expandable portion formed at the other end of the belt is formed by a solid belt.

An air belt assembly of the present invention includes this air belt expanded by means of a gas generator.

It is preferred that the non-expandable portion of this air belt assembly is passed through a through anchor or is inserted in an air belt insert. The air belt assembly is installed in a vehicle such as an automobile, together with a tongue, to which one end of the air belt is connected, and a retractor retracting the other end of the air belt.

BRIEF DESCRIPTION OF THE DRAWINGS

FIG. 1(a) and FIG. 1(b) are perspective views showing a structure of an air belt and an air belt assembly, respectively, of an embodiment according to the present invention.

FIG. 2(a) is a plan view showing an air belt; FIGS. 2(b)(c)(d) and (e) are enlarged cross-sectional views taken along lines B—B, C—C, D—D, and E—E of FIG. 2(a), respectively.

FIG. 3(a) is a cross-sectional view showing the air belt in its expanded state; FIG. 3(b) is a cross-sectional view showing a section B of FIG. 3(a).

DETAILED DESCRIPTION

Figure 4:
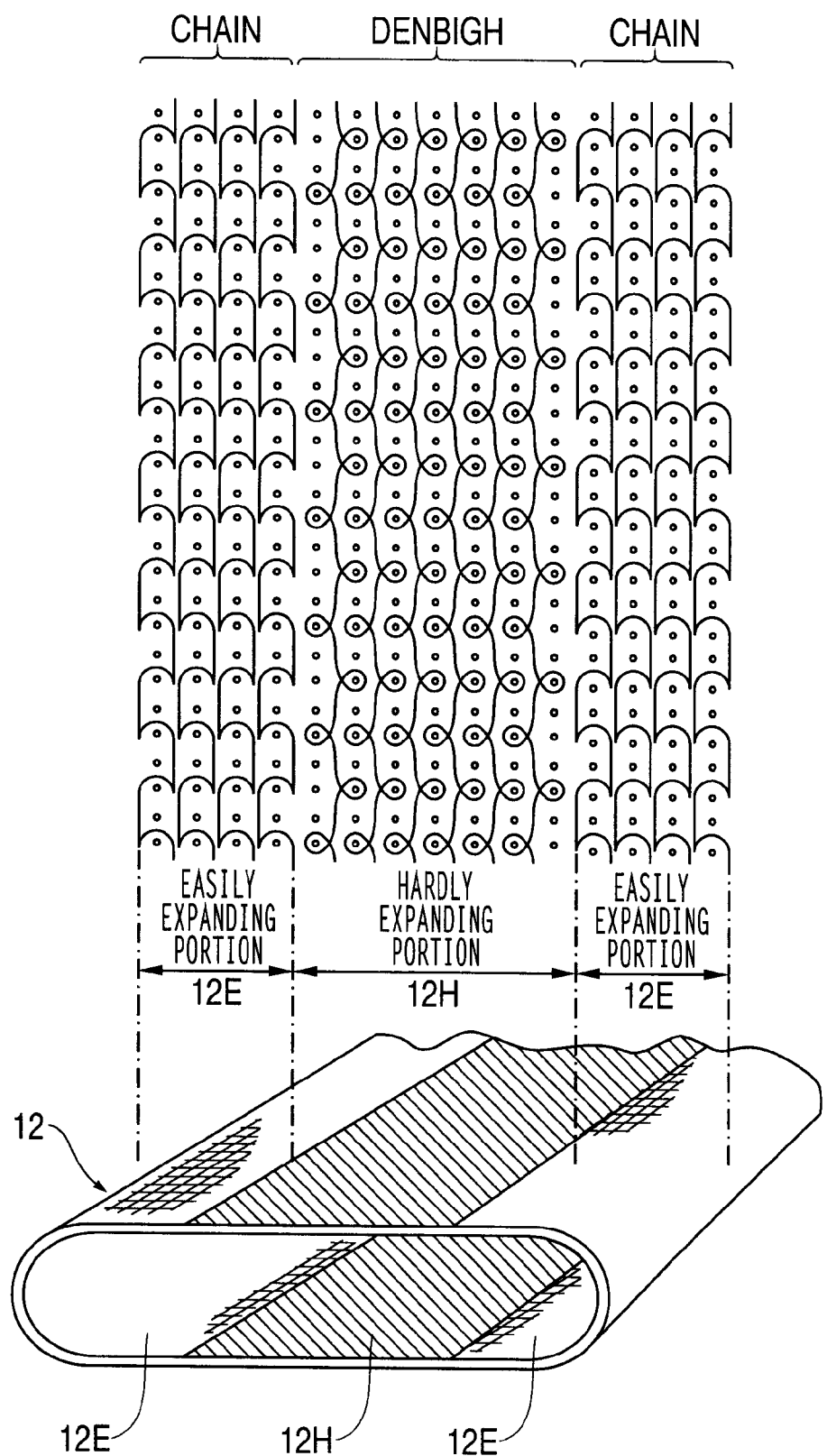
FIG. 4 is a schematic view showing a woven or knitted structure of the belt.

An embodiment of the present invention will now be described with reference to the attached drawings. The air belt assembly of this embodiment includes an air belt 10 having a bag 11 and a belt 12, which is a woven or knitted structure encompassing the bag 11. The bag 11 is located to face the chest and abdomen of a passenger seated in the vehicle.

The belt 12 has a single layer portion 12a formed by a belt having a relatively small width, a flat, tubular multiple layer portion 12c, and an intermediate portion 12b located between the single layer portion 12a and the multiple layer portion 12c. The width of the multiple layer portion 12c is relatively large. The width of the intermediate portion 12b is gradually reduced from the multiple layer portion 12c to the single layer portion 12a. The intermediate portion 12b thus has a tapered, flat tubular shape.

Each side of the multiple layer portion 12c and the associated side of the intermediate portion 12b form an easily expanding portion 12E that is readily expanded in a width direction of the belt 12. The intermediate section of the multiple layer portion 12c and the intermediate section of the single layer portion 12a in the width direction of the belt 12 form a hardly expanding portion 12H, which is not easily expanded. In this embodiment, as shown in FIG. 4, the easily expanding portion 12E is a chain-stitched structure and is readily expanded in the belt width direction. Further, the hardly expanding portion 12H is a denbigh-stitched structure and is hard to extend in the width direction or an elongated direction of the belt.

In this embodiment, the single layer portion 12a is also a denbigh-stitched structure and is hard to extend in the width direction or the elongated direction of the belt.

The belt 12 is an integral, knitted or woven body extending along the single layer portion 12a, the intermediate portion 12b, and the multiple layer portion 12c. That is, the belt 12 is not a belt-like cloth or fabric, which is folded once and the overlapping sides of which are sewn together. The multiple layer portion 12c and the intermediate portion 12b are knitted or woven to form a single tube. Particularly, the hardly expanding portion 12H of the intermediate portion 12b and the multiple layer portion 12c is a denbigh-stitched structure extending continuously to the single layer portion 12a. The multiple layer portion 12c and the intermediate portion 12b are formed by flattening a tubular, knitted or woven structure through, for example, heat pressing, to provide, a pair of flat portions S1, S2.

The flat portions S1, S2 form a solid belt-like structure obtained through, for example, inter-weaving, at the single layer portion 12a. In other words, the threads forming the knitted or woven structure extend continuously from the single layer structure 12a to the intermediate portion 12b.

The bag 11 is provided only in the multiple layer portion 12c. The bag 11 is folded along a predetermined number of folding lines extending longitudinally in the air belt 10. The bag 11 thus forms a folded body having a relatively small width, or a width substantially equal to that of the multiple layer portion 12c.

The distal end of the bag 11, together with the distal end of the belt 12, is connected to the tongue 5.

The single layer portion 12a of the belt 12 is passed through the through anchor 6. The single layer portion 12a is connected to the retractor 7 and is retracted and extended by the retractor 7.

Figure 5:
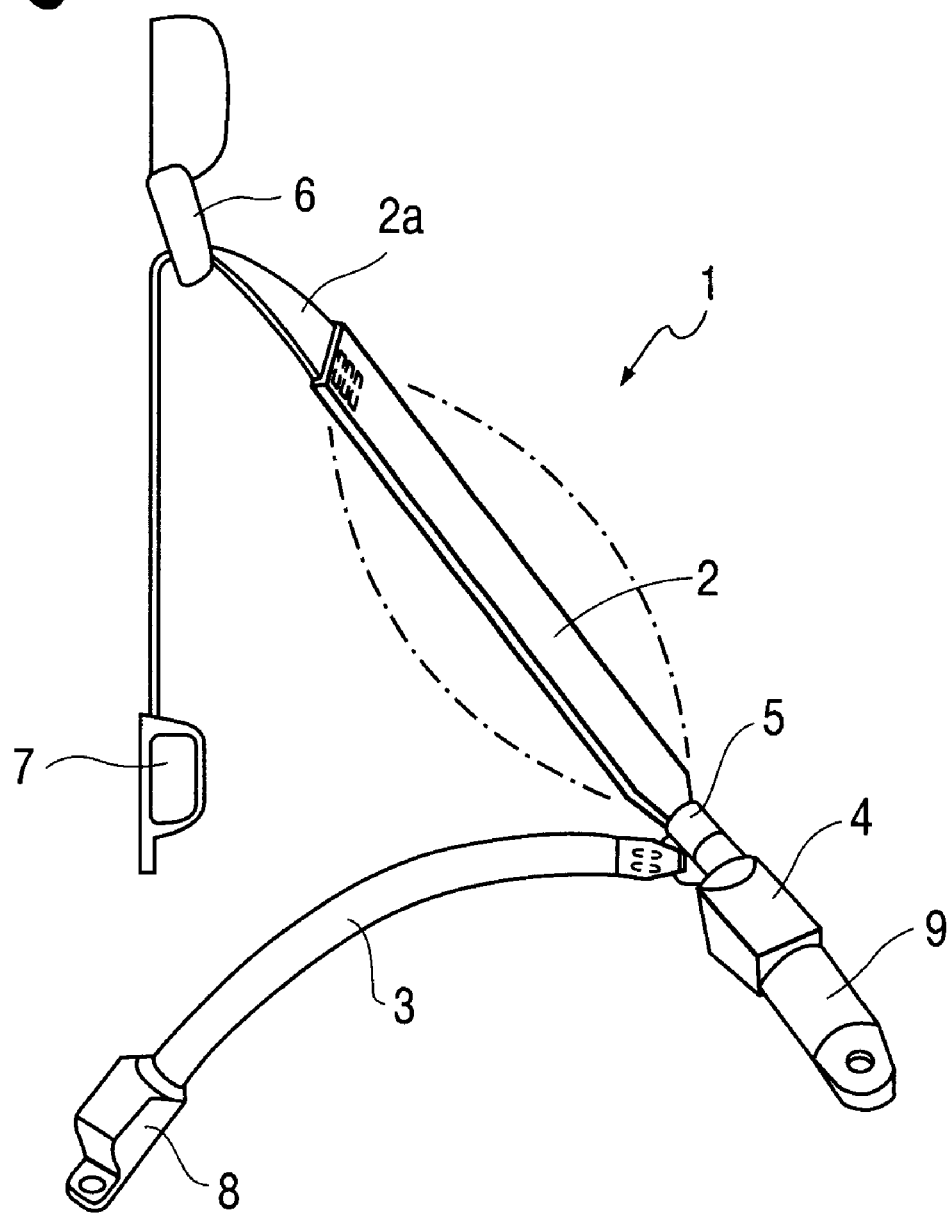
FIG. 5 is a perspective view of a conventional air belt assembly.

The remaining structure of this air belt assembly is identical to that of FIG. 5, and common constituents are indicated by common reference numerals.

The air belt assembly constructed as above is installed in the vehicle with the single layer portion 12a of the air belt 12 passed through the through anchor 6. The single layer portion 12a smoothly slides along the through anchor 6 and is readily retracted and extended by the retractor 7, in the same manner as the prior art webbing.

The air belt 10 has the intermediate portion 12b, the width of which is gradually reduced from the multiple layer portion 12c to the single layer portion 12a. This structure eliminates a portion on which reactive force is concentrated or which is freely movable, thus improving the durability of the air belt 10.

If the gas generator 9 of this air belt assembly is activated with the tongue 5 inserted in the buckle device 4, the bag 11 of the air belt 10 is inflated, as shown in FIG. 3. In this state, only the easily expanding portions 12E, which extend along the sides of the intermediate portion 12b and the multiple layer portion 12c, are expanded, while the hardly expanding portion 12H, which extends along the intermediate sections of the intermediate portion 12b and the multiple layer portion 12c, is hardly expanded. The expanded amount of the belt 12 is thus relatively large in its width direction but is relatively small in its thickness direction. Therefore, when the belt 12 is completely expanded, the multiple layer portion 12c has a substantially flat, oval cross-sectional shape. If the prior art air belt 2 and the air belt 10 have an equal width when expanded, the interior volume of the air belt 10, which is flat when expanded, is much smaller than that of the air belt 2, which defines a circular cross-sectional shape when expanded. Accordingly, if the air belt 10 of the present invention and the prior art air belt 2 face the body of the passenger by an equal surface area, the interior volume of the air belt 10 is much smaller than that of the air belt 2. As a result, even though the gas generator 9 has a relatively small capacity, the air belt 10 is rapidly expanded.

Further, since the air belt 10 has a relatively small interior volume, the air belt 10 is expanded sufficiently rapidly by a normal gas generator even if the air belt 10 has an increased width.

When the air belt 10 is expanded, the longitudinal dimension of the belt 12 is shortened such that the air belt 10 closely contacts the passenger's body. The passenger is thus reliably protected. More specifically, as described above, the hardly expanding portion 12H of the belt 12 extends continuously from the end of the air belt 10 near the tongue to the end of the air belt 10 near the retractor. The air belt 10 is thus hardly expanded in the belt a longitudinal direction. Accordingly, when the bag 11 is inflated, the belt 12 is shortened in its longitudinal direction, thus decreasing the longitudinal dimension of the air belt 10.

Figure 6:
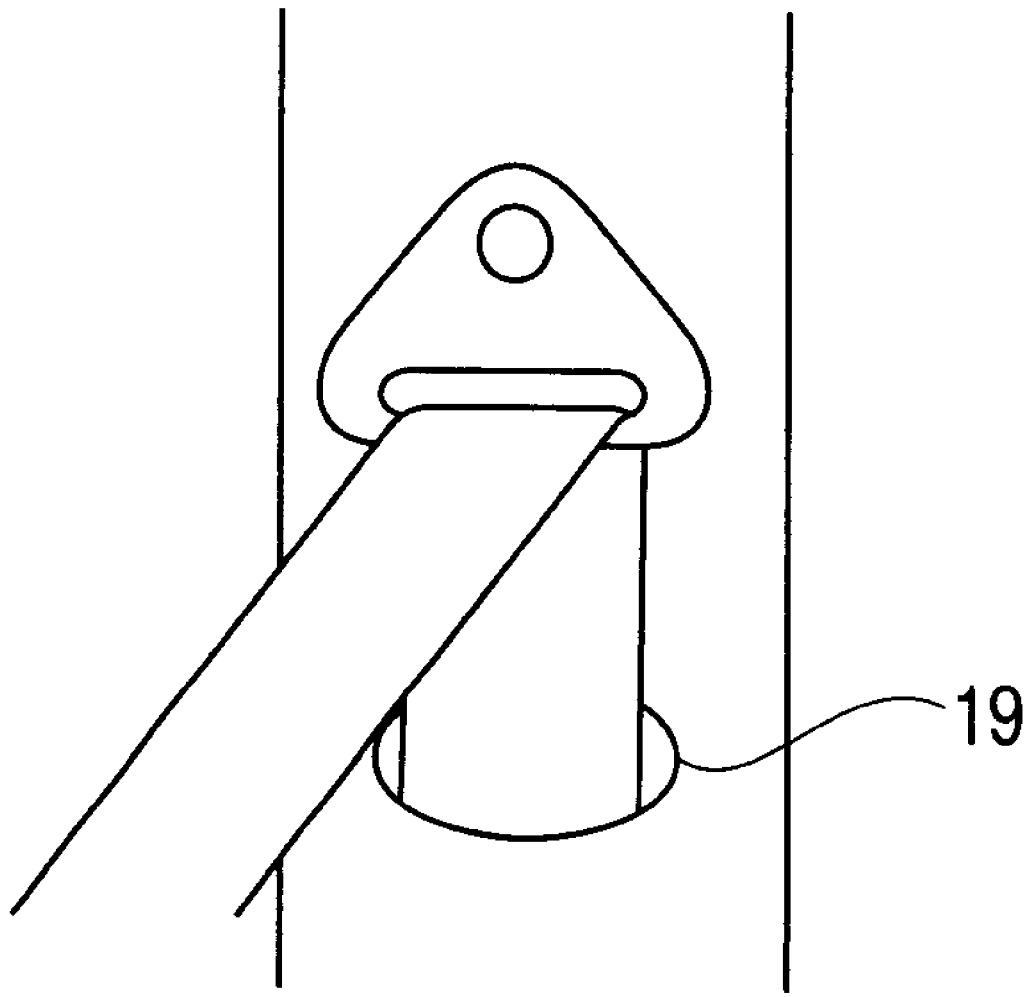
FIG. 6 is a perspective view showing a structure of an air belt assembly with an air belt insert formed in an upper section of a pillar according to an embodiment of the present invention.
Figure 7:
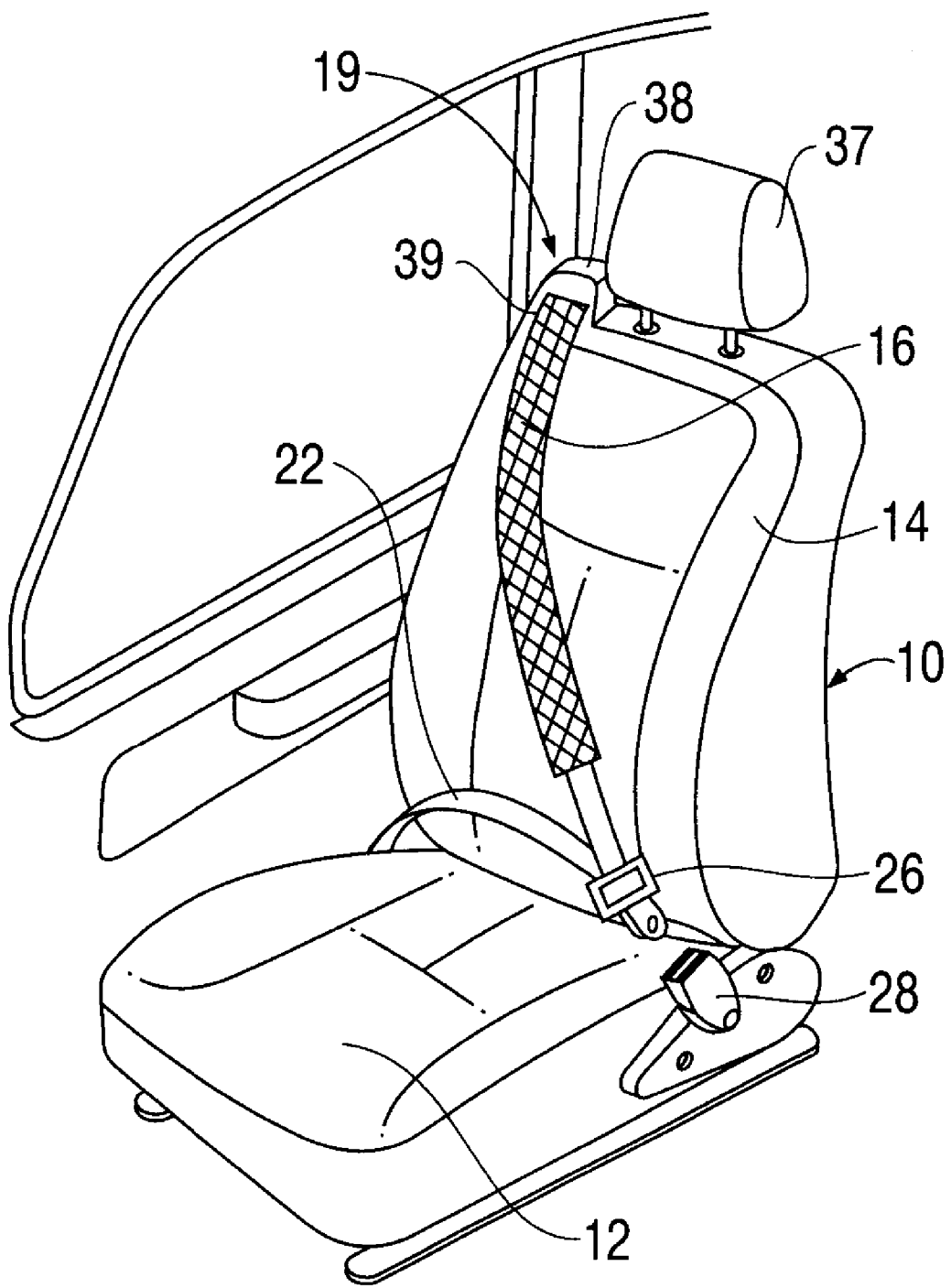
FIG. 7 is a perspective view showing a structure of an air belt assembly with an air belt insert formed in an upper section of a seat back according to an embodiment of the present invention.

In the above embodiment, the air belt 10 is passed through the through anchor 6. However, if the retractor is located in a pillar, the air belt is inserted in an air belt insert 19 formed in an upper section of the pillar as shown in FIG. 6. Similarly, if the retractor is located in a seat back, the air belt is inserted in an air belt insert 19 formed in an upper section of the seat back as shown in FIG. 7.

As described, the air belt of the present invention is expanded in a flat shape. Thus, the air belt is expanded sufficiently rapidly by a gas generator having a relatively small capacity. Further, the surface area at which the air belt contacts the passenger a body may be increased to reduce the force acting to press the passenger a body.

In addition, according to the present invention, the air belt may be directly passed through a through anchor or inserted in an air belt insert and may be retracted directly by a retractor.

This priority document, Japanese Patent Application No. H 11-306658, filed Oct. 28, 1999, is incorporated by reference herein in its entirety.

I claim:

1. An air belt comprising:
   a belt having a hollow expandable portion;
   a bag provided in the hollow expandable portion;
   wherein the air belt is expanded by introducing gas into the bag;
   wherein the hollow expandable portion includes a pair of expandable sections positioned along the outside edges in a longitudinal direction of the belt; and
   wherein the hollow expandable portion includes a less expandable section positioned between the pair of expandable sections.

2. The air belt of claim 1, wherein:
   the belt extends continuously from one end of the air belt to the other; and
   wherein the belt includes a non-expandable portion formed by a solid belt.

3. The air belt of claim 2, wherein a width of the hollow expandable portion is larger than a width of the non-expandable portion when the hollow expandable portion is not expanded.

4. The air belt of claim 3, wherein a width of the belt is gradually reduced from the hollow expandable portion to the non-expandable portion.

5. The air belt of claim 4, wherein the width of the less expanding section when the belt is not expanded is substantially equal to the width of the non-expandable portion.

6. An air belt assembly including the air belt of claim 1 and further comprising a gas generator supplying gas to the bag of the air belt.

7. The air belt assembly as set forth in claim 6, wherein the non-expandable portion of the air belt passes through an anchor.

8. The air belt assembly of claim 7, further comprising a tongue to which one end of the air belt is connected.

9. The air belt assembly of claim 8, further comprising a retractor for retracting the other end of the air belt.

10. The air belt assembly as set forth in claim 6, wherein the non-expandable portion of the air belt is inserted in an air belt insert.

11. An air belt comprising:
    a belt having a hollow expandable portion;
    a bag provided in the hollow expandable portion of the belt;
    wherein the hollow expandable portion includes a pair of expandable sections positioned along the outside edges in a longitudinal direction of the belt;
    wherein the hollow expandable portion includes a less expandable section positioned between the pair of expandable sections;
    wherein the air belt is expanded by introducing gas in the bag; and
    wherein the belt extends continuously from one end of the air belt to the other and includes a non-expandable portion formed by a solid belt.

12. An air belt assembly including the air belt of claim 11 and further comprising a gas generator supplying gas to the bag.

* * * * *